(12) United States Patent
Yu

(10) Patent No.: US 6,956,358 B2
(45) Date of Patent: Oct. 18, 2005

(54) PHOTOFLASH CAPACITOR CHARGER AND METHOD THEREOF

(75) Inventor: Donald Cho Lam Yu, Anaheim, CA (US)

(73) Assignee: Yobon Technologies, Inc., Sindian (TW)

( * ) Notice: Subject to any disclaimer, the term of this patent is extended or adjusted under 35 U.S.C. 154(b) by 70 days.

(21) Appl. No.: 10/772,728

(22) Filed: Feb. 5, 2004

(65) Prior Publication Data

US 2005/0174096 A1    Aug. 11, 2005

(51) Int. Cl.$^7$ .................. H01M 10/44; H01M 10/46
(52) U.S. Cl. .................................................... 320/166
(58) Field of Search ........................... 320/135, 157, 320/159, 162, 166

(56) References Cited

U.S. PATENT DOCUMENTS 6,366,480 B2 * 4/2002 Hosotani et al. ......... 363/21.14
6,518,733 B1   2/2003 Schenkel et al. ........... 320/166
6,636,021 B2 * 10/2003 Schenkel et al. ........... 320/166

* cited by examiner

Primary Examiner—Edward H. Tso
(74) Attorney, Agent, or Firm—Thomas, Kayden, Horstemeyer & Risley

(57) ABSTRACT

A method for charge control of a photoflash capacitor. The method includes generating an input current to induce a charge current for the photoflash capacitor when an activation signal is asserted, detecting a first voltage from the photoflash capacitor and a second voltage corresponding to the input current, asserting and de-asserting a recharge signal respectively when the first detected voltage is lower and higher than a first reference voltage, asserting and de-asserting a current limit signal respectively when the second detected voltage is higher and lower than a second reference voltage, asserting the activation signal only when the recharge signal is asserted and the current limit signal is de-asserted, and providing a pin for connection of a resistive element which determines the second reference voltage.

10 Claims, 5 Drawing Sheets

PHOTOFLASH CAPACITOR CHARGER AND METHOD THEREOF

BACKGROUND OF THE INVENTION

1. Field of the Invention

The present invention relates to a photoflash circuit and particularly to a method and device for charging a photoflash capacitor utilizing an adjustable charge current limit.

2. Description of the Related Art

Cameras that utilize photoflashes typically include a charging circuit that charges a photoflash capacitor included in the camera. The photoflash capacitor stores energy in the form of electrical charge. This energy is later utilized by the photoflash to produce a "flash" when a picture is taken.

Generally, in a camera with a charging circuit, a battery supplies a current at a certain voltage to a step-up transformer, that is part of the charging circuit. The transformer transforms a voltage of approximately 3 volts (the battery's voltage) to a voltage of 300 volts at which the photoflash capacitor is charged. The photoflash capacitor then provides the energy stored thereon to a trigger circuit that, among other things, contributes to stepping up the voltage on the photoflash (flash tube) to about 4000 volts. This voltage causes ionization of the gas inside the flash tube. When the photoflash is triggered, the discharge of the photoflash capacitor through the ionized flash tube generates a very high current therethrough, which thereby causes light in the flash tube.

FIG. 1 shows a circuit diagram of a photoflash capacitor charging circuit disclosed in U.S. Pat. No. 6,518,733. A power delivery circuitry 120 operates to transfer power from an input source 170 to the photoflash capacitor 144 (which is preferably coupled to the load). The power delivery circuitry 120 includes an adaptive ON-time circuitry 130, adaptive OFF-time circuitry 135, transformer 122, switch transistor 124, latch 126, and output diode 142. The power delivery circuitry 120 is coupled to the photoflash capacitor 144 via the output diode 142. The anode of the output diode 142 is coupled to the output side of the secondary winding of the transformer 122 and the cathode of the output diode 142 is coupled to the photoflash capacitor 144. The input source 170 is coupled to the input of the primary side of the transformer 122. The output of the primary side of the transformer 122 is coupled to the collector of the switch transistor 124. The emitter of the switch transistor 124 is coupled to the adaptive ON-time circuitry 130.

The polarity orientation of the primary and secondary windings are preferably arranged so that the respective windings have opposite polarity. As illustrated in FIG. 1, polarity indicators 112 and 114 show that the polarity of the primary and secondary windings are opposite. This opposite polarity is useful for implementing a flyback circuit topology.

The adaptive ON-time circuitry 130 includes a first switch resistor 131, which is coupled to the emitter of the switch transistor 124 to form an ON-time node 134. The ON-time circuitry 130 also includes an ON-time comparator 132. The ON-time comparator 132 is coupled to receive voltage signals from the ON-time node 134 and ON-time reference voltage $V_{REF1}$ 133.

The adaptive OFF-time circuitry 135 includes a second switch resistor 136, which is coupled to the secondary winding of the transformer 122 and to non-inverting terminal of the OFF-time comparator 137. The OFF-time comparator 137 also receives an OFF-time reference voltage $-V_{REF2}$ 138. The OFF-time reference voltage $-V_{REF2}$ 138 is negative because it is compared to the negative voltage across the second switch resistor 136.

The adaptive ON-time circuitry 130 and adaptive OFF-time circuitry 135 each provides output signals that are received by a latch 126. The Latch 126 is, for example, a set/reset latch. In particular, the reset portion of the latch 126 is coupled to receive the output of the ON-time circuitry 130 and the set portion of the latch 126 is coupled to receive the output of the OFF-time circuitry 135. If the latch 126 receives signals simultaneously for both set and reset, the reset input preferably takes priority. The Latch 126 provides a latch output to the base of the switch transistor 124 based on the output signals provided by the ON-time circuitry 130 and OFF-time circuitry 135. The latch output is toggled to activate or de-activate the switch transistor 124 to generate the switching action necessary for DC-to-DC conversion.

Conventionally, in the previously described circuitry, circuits and elements other than the transformer and photoflash capacitor reside in a single IC. The reference voltage $V_{REF2}$ 138 or $V_{REF1}$ 133 is determined once the IC is fabricated, which allows no adaptation of the charge current limit. This is disadvantageous to photoflash or camera system design.

SUMMARY OF THE INVENTION

The object of the present invention is to provide a method and device for charging a photoflash capacitor utilizing an adjustable charge current limit.

The present invention provides a method for charge control of a photoflash capacitor. The method includes generating an input current to induce a charge current for the photoflash capacitor when an activation signal is asserted, detecting a first voltage from the photoflash capacitor and a second voltage corresponding to the input current, asserting and de-asserting a recharge signal respectively when the first detected voltage is lower and higher than a first reference voltage, asserting and de-asserting a current limit signal respectively when the second detected voltage is higher and lower than a second reference voltage, asserting the activation signal only when the recharge signal is asserted and the current limit signal is de-asserted, and providing a pin for connection of a resistive element which determines the second reference voltage.

The present invention further provides a photoflash capacitor charger operating in conjunction with a microprocessor. The photoflash capacitor charger includes a transformer generating an input current to induce a charge current for a photoflash capacitor when an activation signal is asserted, a recharge controller detecting a first voltage from the photoflash capacitor, and asserting and de-asserting a recharge signal respectively when the first detected voltage is lower and higher than a first reference voltage, and a current limiter detecting a second voltage corresponding to the input current, asserting and de-asserting a current limit signal respectively when the second detected voltage is higher and lower than a second reference voltage, and asserting the activation signal only when the recharge signal is asserted and the current limit signal is de-asserted, wherein the second reference voltage is determined by the microprocessor.

The present invention also provides An integrated circuit for charge current limitation of a photoflash capacitor. The integrated circuit includes first, second, third and fourth pins respectively for reception of a ground voltage, first detected voltage from the photoflash capacitor and connection with a resistive element and a transformer, a switch connected with a resistor in series between the fourth and first pin, a recharge controller connected to the second pin for assertion and de-assertion of a recharge signal respectively when the first detected voltage is lower and higher than a first reference voltage, a comparator circuit including a current source connected to the third pin, and a comparator having a positive input connected to the third pin and a negative input connected where the switch and resistor is connected, and an SR latch having a set input connected to the recharge controller for reception of the recharge signal, a reset input connected to an output of the comparator and an output connected to a control node of the switch.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
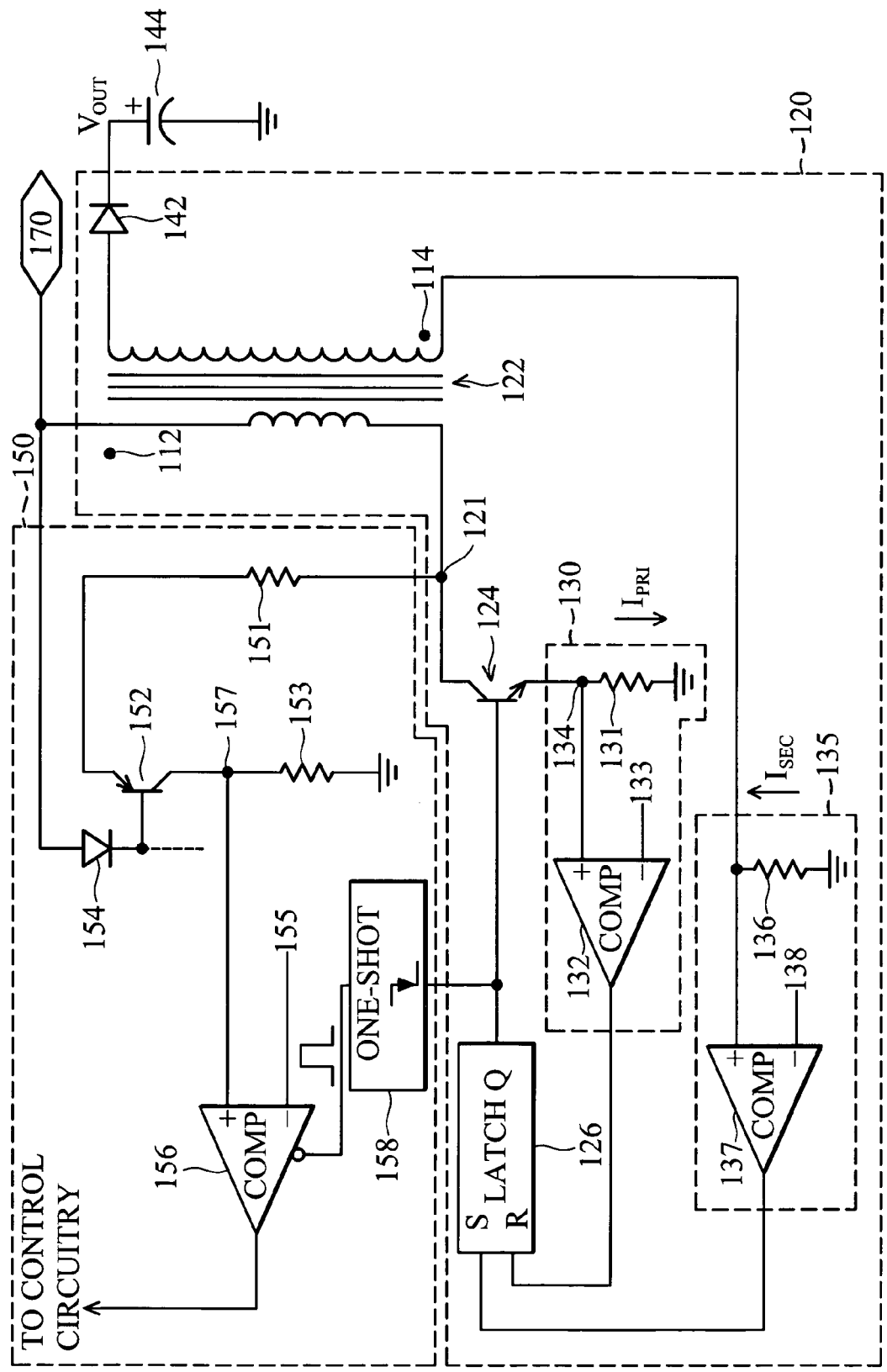
FIG. 1 is a circuit diagram of a photoflash capacitor charging circuit disclosed in U.S. Pat. No. 6,518,733.
Figure 2A:
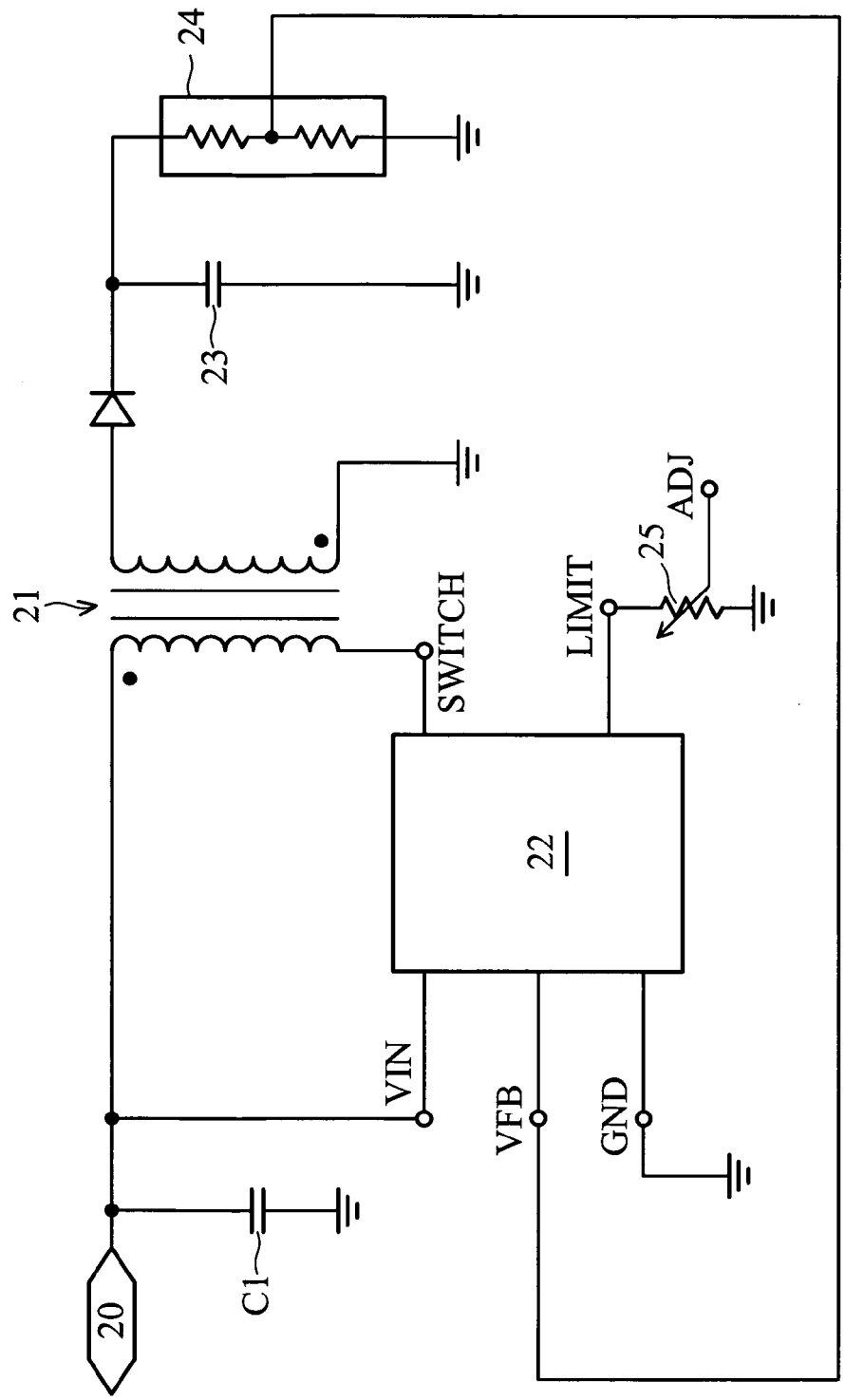
FIGS. 2A and 2B are circuit diagrams of a photoflash capacitor charger according to one embodiment of the invention.

FIG. 2A is a circuit diagram of a photoflash capacitor charger according to one embodiment of the invention. The photoflash capacitor charger operates in conjunction with a microprocessor (not shown) in a digital camera and includes a capacitor C1, a step-up transformer 21, a integrated circuit 22, an ultra-fast diode D1, a photoflash capacitor 23, a voltage divider 24 and a variable resistor 25. The step-up transformer 21 has one end of its primary winding coupled to receive a primary input voltage from an input source 20. The other end of the primary winding is coupled to a pin SWITCH of the IC 22 so that an input current is generated to induce a charge current for the photoflash capacitor 23 only when the IC 22 couples the pin SWITCH to ground. The pin SWITCH is coupled to ground when an internal activation signal VS (not shown in FIG. 2A and described later) of the IC 22 is asserted.

The IC 22 comprises at least five pins VIN, GND, VFB, LIMIT and SWITCH respectively for reception of the primary input voltage from the input source 20, a ground voltage and an output voltage from the voltage divider 24 detecting the voltage on the photoflash capacitor, and connection with a resistive element 25 and the primary winding of the step-up transformer 21. The IC 22 receives the output voltage VFB from the voltage divider 24, asserts an internal recharge signal L-set when the voltage VFB is lower than a reference voltage VBG, and de-asserts the control signal L-set when the voltage VFB is higher than the reference voltage VBG. Additionally, the IC 22 detects a voltage VC corresponding to the input current in the primary winding of the transformer 21, asserts and de-asserts an internal current limit signal respectively when the detected voltage VC is higher and lower than a reference voltage V-limit, and asserts the activation signal only when the recharge signal is asserted and the current limit signal is de-asserted. The reference voltage V-limit is determined by the resistance 25 which can be adjusted by a signal ADJ from the microprocessor. The detail of the IC 22 is described in the following with reference to FIG. 2B.

Figure 2B:
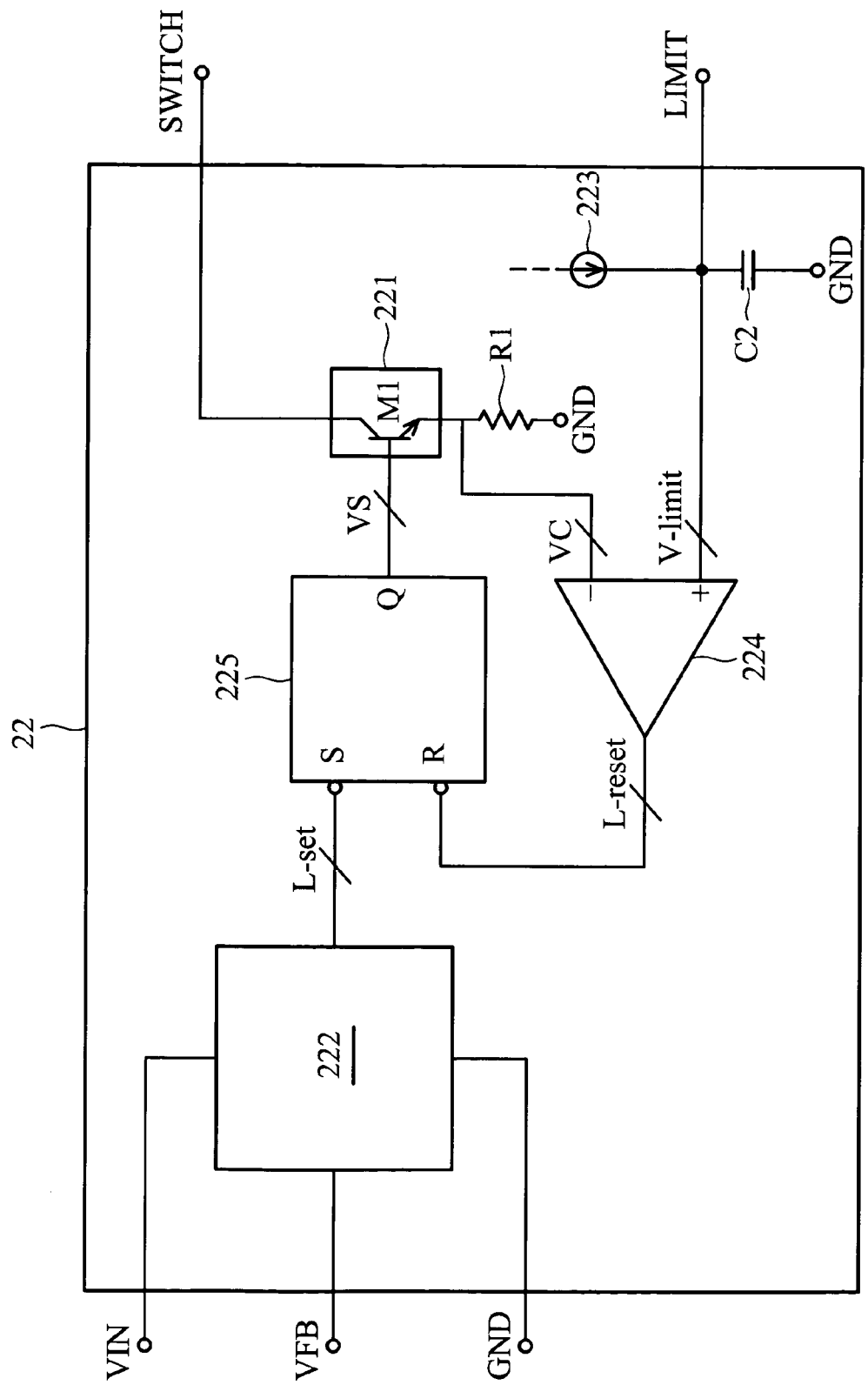

As shown in FIG. 2B, the IC 22 includes a switch 221, recharge controller 222, a comparator circuit comprising a current source 223 and a comparator 224, an SR latch 225, and a resistor R1. The switch 221 is connected with the resistor R1 in series between the pins SWITCH and GND. The recharge controller 222 is connected to the pins VIN, GND and VFB for assertion and de-assertion of the recharge signal L-set respectively when the detected voltage VFB is lower and higher than the reference voltage VBG (not shown). The current source 223 is connected to the pin LIMIT. The comparator 224 has a positive input connected to the pin LIMIT and a negative input connected where the switch 221 and resistor R1 is connected. The SR latch 225 has a set input S connected to the recharge controller 222 for reception of the recharge signal L-set, a reset input R connected to an output of the comparator 224 and an output Q connected to a control node of the switch 221. As is known, the switch 221 may be a transistor M1. The operation of the IC 22 is described in the following with reference to FIG. 3.

Figure 3:
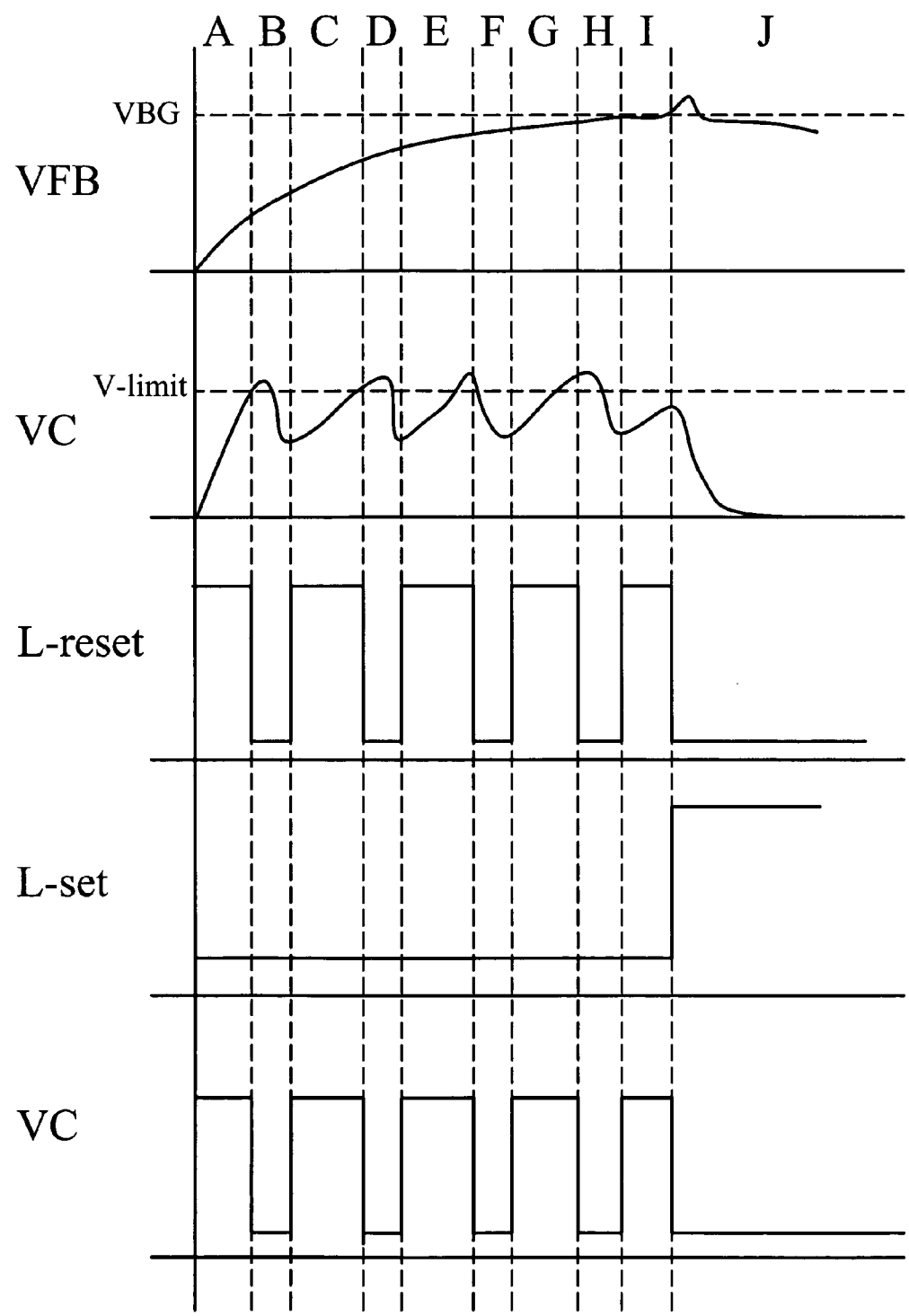
FIG. 3 shows timing of the signals used in the photoflash capacitor charger of FIG. 2B.

The current source 223 generates a constant current through the externally connected resistor 25 so that the reference voltage V-limit is generated on the pin LIMIT. The recharge controller 222 asserts (pulls down) the recharge signal L-set due to the detected voltage VFB being lower than the reference voltage VBG during periods A~I. During the period A, the comparator 224 de-asserts (pulls up) the current limit signal L-reset due to the detected voltage VC being lower than the reference voltage V-limit and the SR-latch 225 asserts (pulls up) the activation signal VS due to the assertion of the recharge signal L-set and de-assertion of the current limit signal L-reset. The asserted activation signal VS turns on the transistor M1, which forms a closed loop on the primary side of the transformer 21 to generate the input current. Thus, the voltage VFB increases due to the charge current induced by the input current. During the period B, the voltage VC is detected as exceeding the reference voltage V-limit so that the current limit signal L-reset is asserted (pulled down). Thus, the SR-latch 225 de-asserts (pulls down) the activation signal VS to turn off the transistor M1, which cuts off the input current. The voltage VC then decreases below the reference voltage V-limit. The operations in periods A and B are repeated in the periods C~I, as shown in FIG. 3. During the period J, the photoflash capacitor 23 is overcharged and the voltage VFB is higher than the reference voltage VBG. Thus, the recharge controller 222 de-asserts (pulls up) the recharge signal L-set so that the SR-latch 225 also de-asserts (pulls down) the activation signal VS to turn off the transistor M1, which terminates the charge of the photoflash capacitor 23. The SR-latch 225 inherently pulls down the signal L-reset when the signal L-set is de-asserted.

In FIG. 3, the voltage VFB rises from a lowest level (near to 0) to VBG during the periods A~I. This happens immediately after a flash is produced. It is noted that the maximum charge current is limited to a certain value determined by the reference voltage V-limit. Since the IC 22 has pin LIMIT for external connection with a resistive element 25, photoflash or camera system designers can easily adapt the reference voltage V-limit to a desired value. Even more, the externally connected resistor 25 may be a variable resistor with a resistance controlled by the signal ADJ from the microprocessor of the camera, as shown in FIG. 2A.

Figure 4:
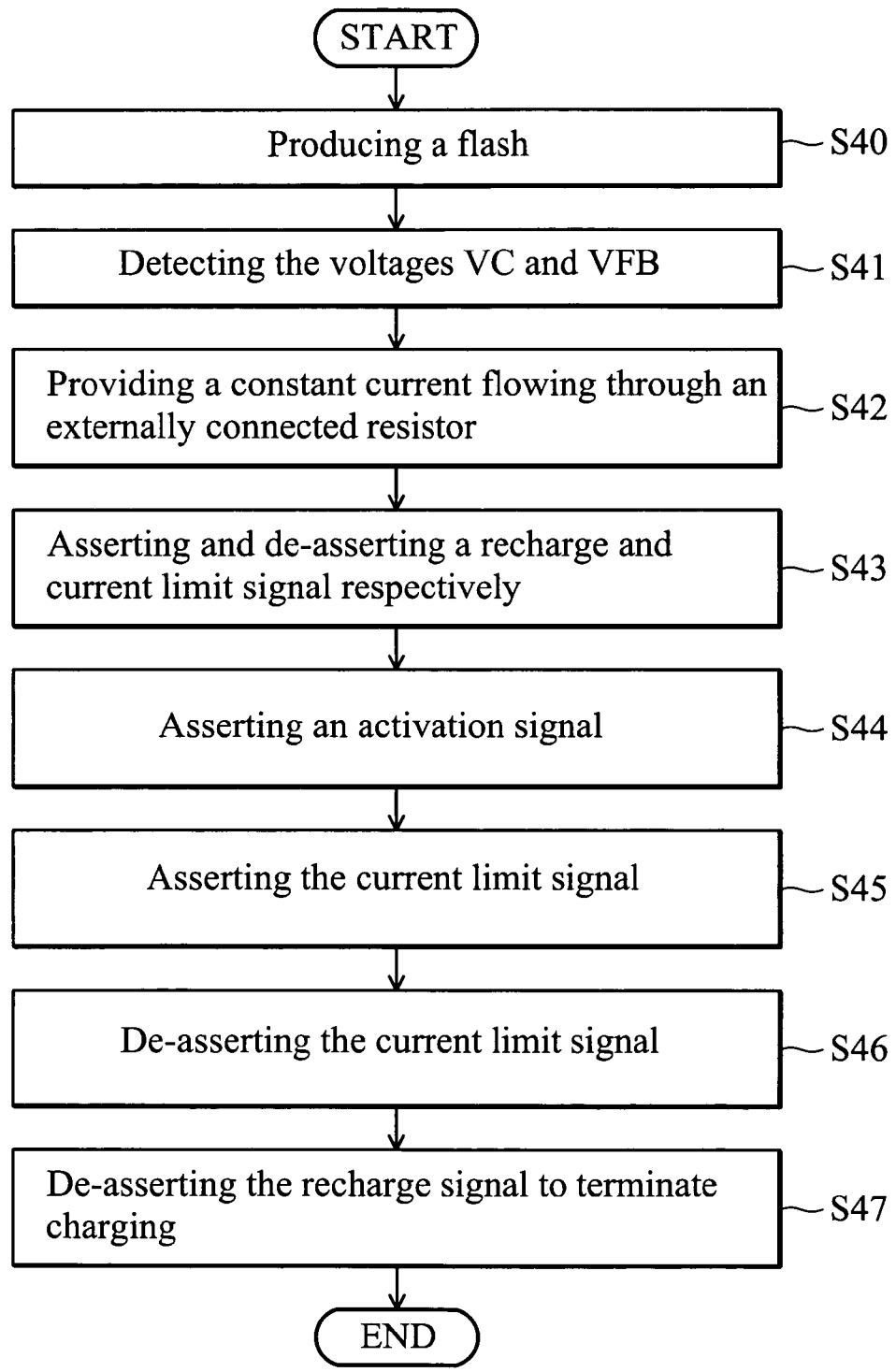
FIG. 4 is a flowchart of a method for charging a photoflash capacitor according to one embodiment of the invention.

FIG. 4 is a flowchart of a method for charging a photoflash capacitor according to one embodiment of the invention.

In step S40, a flash is produced by discharging a photoflash capacitor through an ionized flash tube.

In step S41, a voltage VFB on the photoflash capacitor and a voltage VC corresponding to an input current on the primary side of a transformer are detected.

In step S42, a current source is provided to generate a constant current through an externally connected resistor.

In step S43, a recharge signal is asserted due to the detected voltage VFB being lower than a reference voltage VBG and a current limit signal is de-asserted due to the voltage VC being lower than a voltage difference V-limit across the externally connected resistor.

In step S44, an activation signal is asserted in response to both the asserted recharge signal and de-asserted current limit signal, which closes a switch to form a loop on the primary side of the transformer. Thus, an input current is generated to induce a charge current for the photoflash capacitor.

In step S45, the current limit signal is asserted due to the voltage VC increasing past the voltage V-limit. In response to the asserted current limit signal, the activation signal is de-asserted to open the switch, which cuts off the input current.

In step S46, the voltage VC begins to decrease since the input current is cut off. The current limit signal is de-asserted when the voltage VC falls below the voltage V-limit.

In step S47, the recharge signal is de-asserted when the voltage VFB is higher than the voltage VBG. In response to the de-asserted recharge signal, the activation signal is de-asserted to open the switch, which terminates the charge of the photoflash capacitor.

In conclusion, the present invention provides a method for charging a photoflash capacitor, and a photoflash capacitor charger, wherein a charge current limit is adjustable. The circuitry for recharge control is designed so that the IC has a pin for external connection with a resistive element determining the current limit. Thus, photoflash or camera system designers can easily adapt the current limit to a desired value and even more, the current limit may be set manually by the user or automatically by the microprocessor.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for charge control of a photoflash capacitor comprising the steps of:
    generating an input current to induce a charge current for the photoflash capacitor when an activation signal is asserted;
    detecting a first voltage from the photoflash capacitor and a second voltage corresponding to the input current;
    asserting and de-asserting a recharge signal when the first detected voltage is lower and higher than a first reference voltage, respectively;
    asserting and de-asserting a current limit signal when the second detected voltage is higher and lower than a second reference voltage, respectively;
    asserting the activation signal only when the recharge signal is asserted and the current limit signal is de-asserted; and
    providing a pin for connection of a resistive element which determines the second reference voltage.

2. The method as claimed in claim 1, wherein the input current is generated by the activation signal closing a switch to form a loop on a primary side of a transformer and cut off by the activation signal opening the switch.

3. The method as claimed in claim 1 further comprising the step of generating a constant current flowing through the resistive element, wherein the second reference voltage is a voltage difference across the resistive element.

4. A photoflash capacitor charger operating in conjunction with a microprocessor, comprising:
    a transformer generating an input current to induce a charge current for a photoflash capacitor when an activation signal is asserted;
    a recharge controller detecting a first voltage from the photoflash capacitor, and asserting and de-asserting a recharge signal when the first detected voltage is lower and higher than a first reference voltage, respectively; and
    a current limiter detecting a second voltage corresponding to the input current, asserting and de-asserting a current limit signal respectively when the second detected voltage is higher and lower than a second reference voltage, and asserting the activation signal only when the recharge signal is asserted and the current limit signal is de-asserted;
    wherein the second reference voltage is determined by the microprocessor.

5. The photoflash capacitor charger as claimed in claim 4, wherein the current limiter comprises:
    a comparator circuit asserting and de-asserting the current limit signal respectively when the detected voltage is higher and lower than the reference voltage; and
    an SR latch asserting the activation signal if the recharge signal is asserted and the current limit signal is de-asserted, otherwise, de-asserting the activation signal.

6. The photoflash capacitor charger as claimed in claim 5, wherein the comparator circuit comprises:
    a current source;
    a resistive element having a first end coupled to the current source and a second end coupled to a ground; and
    a comparator having a positive input coupled to the first end of the resistive element and a negative input receiving the second detected voltage, and outputting the current limit signal;
    wherein the resistive element is adjustable.

7. The photoflash capacitor charger as claimed in claim 4 further comprising a switch coupled in a path of the input current, closed and opened respectively when the activation signal is asserted and de-asserted.

8. The photoflash capacitor charger as claimed in claim 4 further comprising a resistor coupled in a path of the input current, wherein the second detected voltage is a voltage difference across the resistor.

9. An integrated circuit for charge current limit of a photoflash capacitor, comprising:
    first, second, third and fourth pins respectively for reception of a ground voltage, first detected voltage from the photoflash capacitor and connection with a resistive element and a transformer;
    a switch connected with a resistor in series between the fourth and first pin;

a recharge controller connected to the second pin for assertion and de-assertion of a recharge signal respectively when the first detected voltage is lower and higher than a first reference voltage;

a comparator circuit comprising:
  a current source connected to the third pin; and
  a comparator having a positive input connected to the third pin and a negative input connected where the switch and resistor is connected; and an SR latch having a set input connected to the recharge controller for reception of the recharge signal, a reset input connected to an output of the comparator and an output connected to a control node of the switch.

10. The integrated circuit as claimed in claim 9, wherein the switch is a transistor.

* * * * *